March 19, 1940.  N. A. BEST  2,194,080
VALVE
Filed April 1, 1938
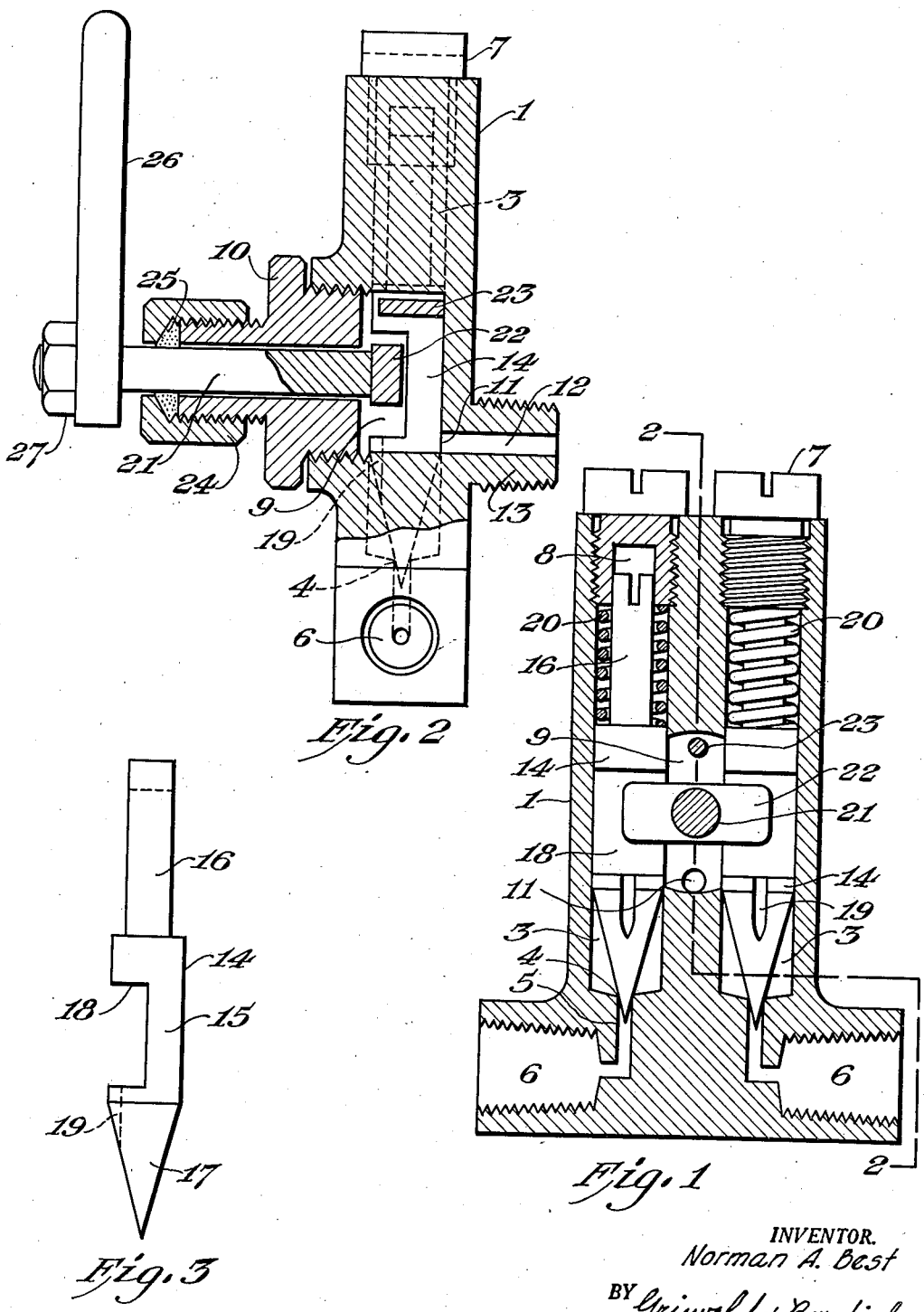
INVENTOR.
Norman A. Best
BY Griswold & Burdick
ATTORNEYS.

Patented Mar. 19, 1940

2,194,080

UNITED STATES PATENT OFFICE 2,194,080

VALVE

Norman A. Best, Midland, Mich., assignor to The Dow Chemical Company, Midland, Mich., a corporation of Michigan Application April 1, 1938, Serial No. 199,419

2 Claims. (Cl. 277—20)

This invention relates to valves, and more particularly to a multiple valve adapted to control the flow of gases or volatile liquids under pressure.

An object of the invention is to provide a quick-seating valve for use on containers for highly volatile liquids.

A particular object is to provide a multiple valve permitting a selected two-way flow of fluid in which there is a positive shut-off of a non-selected flow passage.

Another object is to provide a multiple valve of the aforesaid type in which leakage or by-passing from the open flow passage through a closed flow passage is reduced to a minimum.

Still another object is to provide means in a multiple valve for quickly changing the direction of flow from one passage to another, in which the one passage must be positively closed before the other passage can be opened.

A further object is to provide a valve having a spring-actuated closing member in which the spring tension can be readily varied or adjusted.

Other objects and advantages of the invention will be apparent from the following description and annexed drawing.

In said drawing:

Fig. 1 is a transverse section of a preferred embodiment of the invention, in which certain internal structural members are shown in elevation.

Fig. 2 is a view partially in section perpendicular to that of Fig. 1, and along the line 2—2 of Fig. 1.

Fig. 3 is a detail of the plunger shown in Figs. 1 and 2.

Referring to the drawing, particularly Figs. 1 and 2, the valve body 1 is formed from a metal block, in which are bored two cylinders 3,3 with parallel axes. At the bottom of each cylinder is a port 4 leading into a passage 5 bored in the block, passages 5 terminating in an enlarged section 6 internally threaded to receive a pipe connection. The upper end of cylinders 3 is threaded, and is closed by plug 7 screwed thereinto. Plugs 7 are bored to form a cylindrical recess 8.

The two cylinders 3 are joined at an intermediate section by a chamber 9, which is formed by boring one side the valve block perpendicularly to the axes of the cylinders at a point centrally located with respect to the cylinders. The open end of chamber 9 is closed by a plug 10 threaded thereinto. An open port 11 is located in chamber 9, leading to a rearwardly extending passage 12 bored in a boss 13, which is threaded for a pipe connection.

In cylinders 3 is a plunger 14, shown in detail in Fig. 3. Plunger 14 consists of a cylindrical body portion 15 having a diameter to give a good sliding fit in cylinder 3, a stem 16 of reduced diameter and a conical tip 17. A square notch 18 is cut in one side of plunger body 15, and from the lower lip of the notch a groove 19 extends partly into tip 17 to afford communication between the notch and the lower end of the cylinder. Plungers 14 are set in cylinders 3 so that notches 18 face forwardly and register with chamber 9. In lowered position tip 17 fits into and is seated upon the shoulder of port 4 closing it as in a conventional needle valve. Stem 16 of plunger 14 fits into recess 8 in plug 7 with sufficient end clearance to permit vertical movement of the plunger. Coiled compression spring 20 is inserted about stem 16 in the space between plug 7 and the shoulder of plunger body 15 to hold the plunger normally in "down" position closing port 4.

Plug 10 closing chamber 9 is provided with an outwardly extending concentric boss externally threaded, and is centrally bored through the boss to receive valve stem 21, to the inner extremity of which is secured a cam or lifter 22. Cam 22 is of sufficient length to engage with notches 18 in plungers 14, when the cam is turned, being disposed close to the upper lip of the notch. The radius of the cam and its position is so adjusted to the height of notch 18, however, that, when the cam is turned on its axis, it clears the lower lip of the notch. A striking pin 23 in chamber 9 limits the travel of cam 22 when the latter is turned. A nut 24 threaded on the outer boss of plug 10 encloses a packing ring 25 about valve stem 21. A handle 26 is attached to the outer end of valve stem 21 and held in place by nut 27.

In normal position the plungers 14 are held tightly against their valve seats by the tension of springs 20, and both valves are closed. By turning the valve stem in either direction one of the plungers 14 is raised by the engagement of cam 22 in notch 18, while the other plunger is not moved. When one plunger is raised the port 4 in the bottom of corresponding cylinder 3 is opened to provide a flow passage from the inlet into chamber 3, thence through groove 19, notch 18 and chamber 9 to port 11, while the port in the bottom of the other cylinder remains tightly closed. Upon releasing the pressure on the handle of the valve stem the spring tension immediately forces the cam back to neutral position, and causes the plunger to drop and close the port at the bottom of the cylinder. Reversing the direction of turning of the cam raises the other plunger, and opens a flow passage from the other bottom inlet to the rear port. In all cases, however, one flow passage is positively closed before the other can be opened. The spring tension on the plungers can be varied somewhat, if desired, through a screw adjustment of plugs 7.

The valve herein described is especially adapted for use on containers or pipe lines for highly volatile liquids, such as ethyl chloride, methyl bromide, and the like, which exert a considerable vapor pressure at normal temperatures, although it is suitable for many other uses, as will be readily apparent. A three-way multiple valve of the type shown is suitable for controlling alternate flow of fluid through two passages, while preventing by-passing from one flow passage to the other. A similar valve provided with a single cylinder and plunger is adapted to control flow in a single passage. In any case the quick-seating feature of the valve causes an instantaneous shut-off as soon as pressure is released on the handle of the valve stem turning the cam.

Other modes of applying the principle of my invention may be employed instead of the one explained, change being made as regards the means herein disclosed, provided those stated by any of the following claims or the equivalent of such stated means be employed.

I therefore particularly point out and distinctly claim as my invention:

1. In a valve, the combination of a valve body, a cylinder therein closed at the one end and having a port at the other end thereof, a chamber communicating with said cylinder, a port in said chamber, a slidable plunger in said cylinder adapted to close the port therein, spring means in said cylinder between the closed end thereof and the plunger to hold the latter in port-closing position, a notch in said plunger registering with said chamber and communicating with the port in said cylinder through a slot in the plunger, a valve stem, a cam lifter on said stem positioned in said chamber and adapted to engage the notch in said plunger when the stem is turned to raise the plunger against the spring tension and thereby open a flow passage between the ports.

2. In a multiple valve, the combination of a valve body, two parallel cylinders therein closed at one end and having a port at the other end thereof, a chamber joining said cylinders at an intermediate section thereof, a port in said chamber, a slidable plunger in each cylinder adapted to close the port therein, spring means in each cylinder between the closed end thereof and the plunger to hold the latter in port-closing position, a notch in each plunger registering with said chamber and communicating with the port in the corresponding cylinder through a slot in the plunger, a valve stem, a cam lifter on said stem positioned in said chamber and adapted to engage the notch optionally in one or the other of said plungers when the stem is turned, depending upon the direction of rotation, to raise the plunger against the spring tension and open a flow passage from the port in the respective cylinder to the port in said chamber, the other plunger remaining in closed position so long as the one plunger is raised.

NORMAN A. BEST.